J. YEMIKER.
COLLAPSIBLE CORE FOR BUILDING TIRES.
APPLICATION FILED FEB. 11, 1919.
1,320,816.
Patented Nov. 4, 1919.
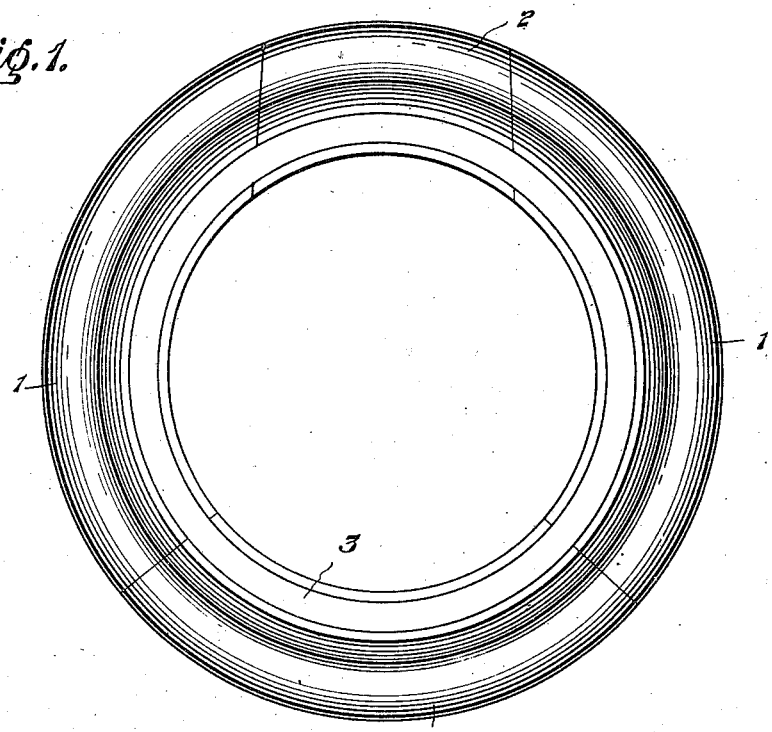
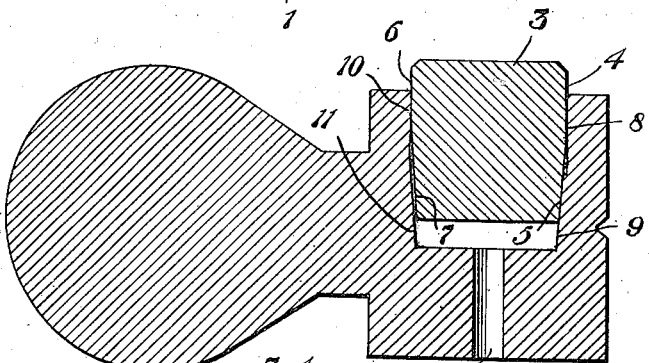
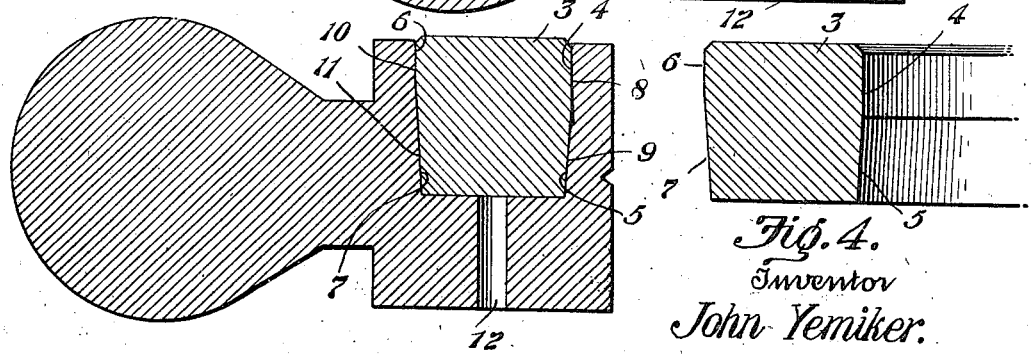
Inventor
John Yemiker.
Attorneys

UNITED STATES PATENT OFFICE.

JOHN YEMIKER, OF AKRON, OHIO.

COLLAPSIBLE CORE FOR BUILDING TIRES.

1,320,816.  Specification of Letters Patent.  Patented Nov. 4, 1919.

Application filed February 11, 1919. Serial No. 276,276.

*To all whom it may concern:*

Be it known that I, JOHN YEMIKER, a citizen of the United States, residing at Akron, in the county of Summit and State of Ohio, have invented a new and useful Collapsible Core for Building Tires, of which the following is a specification.

The invention relates to collapsible cores for building the outer casings of pneumatic tires and has more especial reference to certain novel means by which the several segmental sections of a separable or knockdown tire building core may be quickly and accurately brought into and held in proper relation to one another and quickly disconnected when the core is to be knocked down preparatory to removal from the finished tire casing.

The object of the invention is to provide means whereby the several segmental sections of the core may be quickly and accurately brought into proper relation to one another.

A further object is to provide a core of the character referred to with means for drawing the segmental sections of the core tightly together.

The objects of the invention may be attained by providing the several segmental sections of the core with concentric grooves which form a complete annular groove when the sections are placed together in the proper relationship. These grooves are straight upon each side for a portion of the way and then tapered inwardly, the wall of the groove nearest the center being provided with a straight portion of greater depth than the wall farthest from the center.

Although the drawings and above specification disclose the best mode in which I have contemplated embodying my invention I desire to be not limited to the details of such disclosures, for, in the further practical application of my invention, many changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 1 is a side elevation of a core embodying the invention.

Fig. 2 a transverse section through the core, showing the ring partially driven home.

Fig. 3 a similar view showing the ring driven home.

Fig. 4 a transverse section through a portion of the ring.

A practical embodiment of the invention is disclosed in the accompanying drawings, forming a part of this specification in which similar numerals of reference indicate corresponding parts throughout the several views.

The core is composed of a plurality of separable sections which are segmental in form and of proper size and shape to permit a tire casing to be built therearound and are provided with enlarged flanges formed at their inner edges, rectangular in cross section and connected to the main portion of the sections by reduced necks. In the accompanying drawings four of these sections are shown and are designated by the numerals 1 and 2, the sections 1 being of substantially the form shown and the segmental section 2 so formed that said section can be removed after the ring has been detached. Each of the sections is provided with a segmental channel, which channels are for the purpose of receiving the ring 3. This ring is of the form shown in cross section, being straight for a portion of the way upon each side and then tapered upon each side toward the bottom, the straight portion upon the inner edge of the ring being longer than the straight portion upon the outer edge of the ring, thus making the tapered portion of the inner edge of the ring shorter than the tapered portion on the outer edge of the ring. As illustrated in the drawing the ring is provided on the inner face with the comparatively long straight portion 4 extending from the top to a point near the center of the ring and with the slightly tapered portion 5 extending to the bottom edge of the ring and upon the outside edge with the comparatively short straight portion 6 near the top of the ring and the comparatively long tapered portion 7 extending to the bottom of the ring. The curved channel in each segment of the core conforms in cross section to the shape of the ring, that is it is straight for a portion of the way from the top and then tapered to the bottom of the channel. The inner edge of each channel is in cross section straight for a portion of the way from the top as indicated at 8 and then tapered to the bottom of the channel as shown at 9, while the outer edge of the channel is straight for a comparatively short distance as shown at 10 and then tapered to the bottom of the channel as shown at 11. Cores of the character to which this invention relates are made up of a series of segmental sections in order that the core may be removed from the finished casing, but while the core is in use it is necessary to hold all of the segments tightly together and to draw all of said segments toward a common center in order that a perfect circle is produced by the several segments. In order to accomplish this result the ring 3 and the channels are formed in cross section as above described and illustrated in the accompanying drawings, thus allowing the ring to be quickly centered when it is placed in position in the channels and drawing all of the segmental sections uniformly toward the center as the ring is driven into position.

In assembling the core for use the segments are placed together in the proper position and the ring placed in the circular channel formed by the channels of the several segmental sections. The lower portion of the ring being tapered upon both sides will allow the ring to be quickly centered with reference to the channels and the ring will assume a position substantially as shown in Fig. 2. As the ring is driven tighter into the channel it will be seen that all of the segmental sections will be driven toward the center, owing to the tapered face upon the inner edge of the ring engaging the tapered face on the inner edge of the channel before the tapered outer edge of the ring engages the tapered outer edge of the channel. It should be noted that the taper upon the ring and channel is exaggerated in the drawings for the purpose of illustration, but only a slight taper is required upon the actual ring and core in order to cause the ring to frictionally engage the channel in the core. For the purpose of quickly removing the ring when it is desired to knock down the core apertures 12 are provided through the underside of the core for the insertion of a punch to remove the ring.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:—

1. A core of the character described, comprising a plurality of separable sections having inwardly extending portions provided with channels which in the assembled condition of the sections provide an annular channel and an annular ring insertible in said channel, said ring being straight upon each side in cross section for a portion of the way and then tapered upon each side and said channel conforming in cross section to said ring.

2. A core of the character described, comprising a plurality of separable sections having inwardly extending portions provided with channels which in the assembled condition of the sections provide an annular channel and an annular ring insertible in said channel, said ring being straight for a portion of the way upon each side in cross section and then tapered upon each side, the straight portion upon the inner edge of the ring being longer than the straight portion upon the outer edge of the ring, said channel being shaped in cross section to conform to the ring.

In testimony that I claim the above, I have hereunto subscribed my name.

JOHN YEMIKER.